United States Patent Office 3,359,314
Patented Dec. 19, 1967

3,359,314
PROCESS FOR PREPARING ALPHA HYDROXY OXIMES
Corrado Brichta, Adriano Nenz, Giuseppe Ribaldone, Giampiero Borsotti, and Enzo Gallinella, Milan, Italy, assignors, by mesne assignments, to Montecatini Edison S.p.A.
No Drawing. Filed Aug. 6, 1963, Ser. No. 300,165
Claims priority, application Italy Aug. 10, 1962, 673,613; Oct. 31, 1962, 693,084
2 Claims. (Cl. 260—566)

The present invention relates to a process for preparing alpha substituted oximes such as alpha-hydroxyoximes and alpha-acyloxy-oximes and more particularly, to a one step process for preparing alpha-hydroxy-aldoximes, alpha-hydroxy-ketoximes, and alpha-acyloxy-oximes, utilizing as a starting material compounds having an olefinic double bond.

The preparation of certain alpha-hydroxyoximes and alpha-acyloxy-oximes is known. These compounds have been obtained for example, by the two step method of preparing alpha-hydroxy-carbonylic compounds such as alpha-hydroxy-aldehydes and alpha-hydroxy ketones followed by reacting the carbonylic compound with hydroxylamine or its salts.

In some of the known methods of preparation of alpha-acyloxy-oximes the alpha-hydroxy-carbonylic compounds are first esterified by means of acylant agents, and secondly reacted with hydroxylamine or its salts to form the oxime.

Other methods foresee a reaction between alpha-halogen-oximes and alkaline salts of organic acids. Other methods, at last, foresee one first reaction between alkaline salts of carboxylic acids and alpha-halogen carbonylic compounds, and a following reaction of oximation of the carbonylic group with hydroxylamine or its salts.

Generally, such processes present disadvantages and drawbacks due to the necessity of multiple step reactions which complicate the processes themselves and render their practical application difficult.

These known processes for the preparation of alpha-hydroxy-oximes also suffer the disadvantage of employing hydroxy-carbonylic compounds as starting reactants, which are generally obtained through a great series of reactions. Because of difficulty in manufacture, hydroxy-carbonylic compounds are quite expensive and not readily available. It is for this reason that the known processes of preparing alpha-hydroxy-oximes, starting from alpha-hydroxy-carbonylic compounds are not easily adaptable to commercial production.

Another disadvantage of the known processes for preparation of alpha-hydroxy-oximes is the use, as oximation agents, of salts of hydroxylamine in that the cost of such salts is relatively high. The known processes for the preparation of alpha-acyl-oxyoximes also suffer the disadvantage of employing as starting material products which are relatively scarce, because of high cost and difficulty in preparation, such as alpha-halogen-carbonylic and alpha-hydroxy-carbonylic compounds and alpha-halogen-oximes. Another disadvantage of known methods for preparing alpha-acyloxyoximes are low yields of useful products which, in some if not all cases, is due to the long series of successive reactions required in their preparation.

It is therefore an object of the present invention to provide a relatively simple and practical method for preparing alpha-hydroxy-oximes and the respective alpha-acyloxy-oximes in a one stage operation.

Another object is to provide a process which enables manufacture of alpha-hydroxy-oximes and respective alpha-acyloxy-oximes using starting material which is readily obtainable and relatively cheap.

A further object is the provision of a process which enables the preparation of alpha-hydroxy-oximes, as well as alpha-acyloxy-oximes in excellent yields.

These and other objects and advantages of this invention will be apparent from the detailed description of the process hereinafter.

According to the present invention, alpha-hydroxy-oximes and the respective alpha-acyloxy-oximes are obtained by reacting under stirring, organic compounds having at least one double bond of the olefinic type and having at least one atom of hydrogen directly linked to one of the atoms of carbon, which bear the double bond of olefinic type, or their solution in inert solvents with nitrosylsulfuric acid in the presence of an acid selected in accordance with the desired alpha substituent.

In accordance with an embodiment of the invention, the alpha-hydroxy-oximes, as well as the respective alpha-acyloxy-oximes are separated from the reaction mixture by the addition of water preferably iced-cooled, to the reaction mixture and neutralisation of the released mineral acidity. The desired product may then be isolated by any known methods, such as decantation, filtration, extraction with solvents.

The reaction occuring in the process of the present invention may be represented schematically as follows:

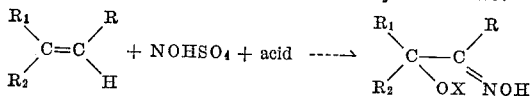

wherein X represents hydrogen and aliphatic, cycloaliphatic, aromatic, and alkyl-aromatic acyl radicals and R, $R_1$ and $R_2$ are selected from the group consisting of hydrogen, alkyl-, cycloalkyl-, monocyclic-aryl-, monocyclic-aralkyl-radicals, cycloaliphatic ring structures comprising between 4 and 12 carbon atoms, formed from the joining of $R_1$ and $R_2$ or of $R_1$ and R through methylenic groups.

Olefine, cyclo-olefines, aryl-substituted olefines, as well as their products of substitution may be employed in the process of this invention. Specific examples of satisfactory starting compounds useful in the process of this invention are ethylene, propylene, oligomers of propylene, butene (1), butene (2), isobutene, pentenes, hexenes, cyclopentene, cyclohexene, methylencyclohexane, cyclooctene, limonene, methylcyclohexene, cyclododecene, styrene, etc.

As mentioned hereinbefore, in order to obtain alpha-hydroxy-oxime, according to the process of the present invention, the reaction is carried out in the presence of sulphuric acid. In the preferred embodiment sulfuric acid having a concentration higher than 65% and preferably equal to about 75% is used. Since the sulphuric acid does not take active part in the reaction of formation of alpha-hydroxy-oximes but rather exerts a solvent action for the intermediate products of the reaction, the quantity to be used may vary in a fairly large interval, ranging, for example, between about 0.1 and 10 moles per mole of the compound containing the olefinic double bond. It is, however, preferred to operate with a molar ratio equal to about 1.

In the preferred embodiment of the present invention where it is desired to obtain alpha-hydroxy-oximes, nitrosyl-sulphuric acid is dissolved in sulphuric acid prior to adding same to the olefinic compound or solution thereof.

To obtain alpha-acyloxy-oximes according to the present invention, the reaction is carried out in the presence of an organic carboxylic acid. The carboxylic acid selected is dependent upon the ester desired. Aliphatic, cycloaliphatic, aromatic, aromatic-aliphatic carboxylic acids and their substitution products have proved to be quite suitable for use in this invention. Particularly good results are obtained when the lower aliphatic acids are used, as acetic acid and propionic acid. The preferred quantity of carboxylic acids used in the process of the present invention, ranges between about 1 and 20 moles per mole of compound having an olefinic double bond.

The acid when used in excess serves the additional function of acting as a solvent for the olefinic double bond compound. While the process, according to the present invention, may be carried out in the absence of solvents or substances which act as solvents for the olefinic compound, it is preferable that a solvent be used for the reason that the use of a solvent enables a more precise control of temperatures during the course of the reaction. Substances which act as solvent of the compound containing the double olefinic bond and which prove suitable for carrying out the present invention, are those in which the olefinic compound exhibits good solubility but does not react with nitrosyl-sulphuric acid or sulfuric acid, or carboxylic acids.

Particularly suitable solvents are the paraffinic and cyclo-paraffinic hydrocarbons, as, for example, petroleum-ether, benzines, cyclohexane, chlorinated solvents: such as methylene chloride and carbontetrachloride; nitro benzene, liquefied sulphur dioxide etc.

The temperature suitable to effect the process of the present invention can vary within a fairly large interval, e.g. between about $-50°$ C. and $+50°$ C. Nevertheless it is preferred to operate in the temperature range comprised between $-20°$ C. and $+10°$ C. The molar ratio between the compound containing the olefinic bond and the nitrosyl-sulfuric acid ranges between 1 and 5 and is preferably slightly higher than 1.

While the reaction is preferably carried out at atmospheric pressure, pressures higher than atmospheric are equally operative.

In accordance with the invention it is desirable that the reaction is carried out with vigorous agitation which aids in the dissipation of reaction heat. It is an added advantage that the method of this invention is readily adaptable to both continuous and batch techniques.

The alpha-hydroxy-oximes as well as the respective alpha-acyloxy-oximes, obtainable by the process of the present invention, are products of considerable industrial interest, useful as intermediates in many organic synthesis. The alpha-hydroxy-oximes in particular, may easily be transformed into the corresponding amino-alcohols or nitro-alcohols; furthermore, they can provide the corresponding carbonylic compounds, all products of considerable importance as intermediates in the chemical industry.

Some alpha-hydroxy-oximes and alpha-acyloxy-oximes, obtained according to the present invention, are entirely new products; for these the melting point or the boiling point and the absorption maxima of the I.R. spectrum have been given.

The following examples will more clearly illustrate the process of this invention and the novel products obtained therefrom.

Example 1

Into a 500 cm.³ flask, provided with a stirrer, thermometer, a dropping funnel and a Dry Ice and trichloroethylene reflux cooler, a solution of 35 gr. propylene in 100 gr. pentane was introduced and then cooled to $-50°$ C.

A solution of 50 gr. nitrosyl-sulfuric acid in 100 gr. of 75% sulfuric acid was slowly introduced allowing the temperature to increase to $-20°$ C. Upon completing the addition, the stirring was continued until the NO+ ion completely disappeared (starch-iodide paper test). The temperature was brought to $-5°$ C. and the excess propylene removed by distillation.

After decantation of the mixture of reaction the upper pentane layer was separated and the lower sulfuric layer was extracted with fresh pentane. A total of 20 gr. of non-reacted propylene was recovered.

The sulfuric solution was poured into water at 0° C., then brought to a pH between 7–8 with a 28% solution of ammonia while maintaining the temperature at not higher than 5° C. The neutralized solution was then repeatedly extracted with ether.

The joined etheral extracts were dried on anhydrous magnesium sulphate and the ether evaporated. After the evaporation of the ether, a liquid residuum was obtained which was distilled under vacuum yielding a fraction of 22.3 gr. having a B.P. 57–58° C./1 mm. Hg; $n_D^{22}=1.4659$; and the following elementary analysis: C=40.6%; H=8.4%; N=15.1%. Calculated for $C_3H_7NO_2$: C=40.4%; H=7.9%; N=15.7%.

The I.R. analysis spectrum of the substance showed the following characteristic maxima (expressed in micron): 3.0; 9.37; 10.4; 10.7.

Heat treating the product with acetic anhydride yielded lactonitrile-acetate (B.P. 70–73° C./8 mm. Hg; literature B.P. 73° C./8 mm. Hg) confirming thusly the identity of the substance as alpha-hydroxy-propionaldoxime.

The yield of alpha-hydroxy-propionaldoxime, calculated on the converted propylene, was 70.2%.

Example 2

Apparatus similar to that used in Example 1 was used. A solution of 25 gr. of isobutylene in 70 gr. of pentane was introduced into a 250 cc. flask and cooled to $-10°$ C. A solution of 40 gr. of nitrosyl-sulfuric acid in 90 gr. of 75% sulfuric acid was slowly added while maintaining the temperature at $-10°$ C. Agitation was continued after the addition until there was no trace of NO+ ions (starch iodide paper test). The upper layer of pentane was separated from the reaction mixture and the lower sulfuric layer was extracted with fresh pentane to completely recover the nonreacted isobutylene. The sulfuric solution, which contained both the hydro-oxime and its sulfuric ester was poured into water at 0° C., followed by the addition of 28% ammonia solution to a pH of about 7–8, while maintaining the temperature not higher than 5° C. The thusly treated solution was then repeatedly extracted with ether. The etheral extracts were collected, dried on anhydrous magnesium sulphate and treated with charcoal. The residuum comprised 22 gr. of a liquid having a B.P. 78–80° C./2.5 mm. Hg, $n_D^{20}$ 1.4628; elementary analysis and I.R. spectrum confirmed identity of the residuum as alpha-hydroxy-isobutyrraldoxime (literature: B.P. 83–83.5° C./3 mm. Hg; $n_D^{20}=1.4625$).

Example 3

In a 250 cm.³ flask, provided with a stirrer, thermometer and a dropping funnel, a solution of 15 gr. of cyclopentene in 45 gr. of cyclohexane was introduced. A 23 gr. nitrosyl sulfuric acid solution in 50 gr. of 75% sulfuric acid was slowly added, while maintaining the temperature constantly at $-5°$ C. Upon completion of the addition, stirring was continued until the NO+ ion had disappeared (starch-iodide paper test).

By following the extraction procedure, as described in the previous example, 3 gr. of cyclopentene and 15 gr. of an oily brown product were obtained, from which 12.5 gr. of alpha-hydroxy-cyclopentanoxime having B.P. 118–119° C./4 mm. Hg, and a M.P. 74°–75° C. were obtained, by distillation.

Elementary analysis gave the following results: C=52.0%; H=7.8%; N=12.3%. Calculated for $C_5H_9NO_2$: C=52.1%; H=7.8%; N=12.1%.

The I.R. spectrum of the substance exhibited the following characteristic maxima:

3.1=5.95=9.32=9.45=9.70=10.13=10.35=10.76

(expressed in micron).

The measure has been carried out in KBr tablet.

The I.R. spectrum resulted the same as that of the alpha-hydroxy-cyclo-pentanonoxime obtained by oximation of the alpha-hydroxy-cyclo-pentanone; the melting point of the product, mixed with alpha-hydroxy-cyclopentanonoxime did not suffer any depression. The yield of distilled alpha-hydroxy-cyclo-pentanonoxime calculated on the converted cyclopentane was 61.6%.

Example 4

A solution of 20 gr. of 2-pentene in 60 gr. of cyclohexane was introduced into the same equipment used in Example 3, then a solution of 30 gr. of nitrosyl-sulfuric acid in 66 gr. of sulfuric acid at 75% was added slowly, with the temperature constantly maintained at −5° C. The solution was stirred until the NO+ ion has completely disappeared (starch-iodide paper test). The reaction mixture was treated in the manner described in the former examples.

21 gr. of 3-hydroxy-pentan-2-one-oxime having a B.P. 94–95° C./3 mm. Hg and a M.P.=90–91° C. were obtained, corresponding to the following elementary analysis: C=51.7%; H=9.8%; N=12.0%. Calculated for $C_5H_{11}NO_2$: C=51.2%; H=9.4%; N=11.9%.

The melting point of the product mixed with 3-hydroxy-pentan-2-one oxime obtained by oximation of 3-hydroxy-pentan-2-one did not undergo any depression.

The I.R. analysis spectrum showed the following characteristic maxima (expressed in micron): 3.8; 6.0; 9.13; 9.5; 9.76; 9.98; 10.14; 10.45; 11.18.

The measure was carried out in KBr tablet.

Example 5

Into a 250 ml. flask, provided with a stirrer, thermometer and a metering device for solids, a solution of 20 gr. of 2-pentene in 60 gr. of glacial acetic acid was introduced; followed by the addition of 29 gr. of nitrosyl sulfuric acid in small portions while maintaining the temperature at 10° C.

When the NO+ ion had completely disappeared, the reaction mixture was slowly poured into water and the temperature maintained at 0° C.; the non-reacted 2-pentene was extracted with petroleum ether.

The water-solution was brought to pH 7–8 with a 28% ammonia solution while externally cooling with ice. The solution was then extracted with ether. The collected ethereal extracts were dried on anhydrous magnesium sulphate and treated with charcoal: 24.5 gr. of 3-acetoxy-pentan-2-one-oxime having a B.P.=88° C./3 mm. Hg were obtained, corresponding to the following elementary analysis: C=52.9%; H=8.6%; N=9.0%. Calculated for $C_7H_{13}NO_3$: C=52.8%; H=8.2%; N=8.8%.

The I.R. analysis spectrum indicated the following characteristic maxima (expressed in micron): 3.0; 5.76; 6.03; 9.1; 9.2; 9.55; 9.8; 10.45; 11.25.

Example 6

Into a 250 cm.³ flask, provided with a stirrer, thermometer and dropping funnel, containing 30 gr. of cyclohexene and 30 gr. of cyclo-hexane a solution of 38 gr. of nitrosyl sulfuric acid in 84 gr. of 75% sulfuric acid was introduced while maintaining the temperature at −5° C.

Upon completing the addition, the lower sulfuric layer of the reaction mixture, at first of a dark red color, gradually became pale yellow in color. The reaction to this point was finished; the reaction of the NO+ ion was negative (starch iodide paper test).

After decantation of the reaction mixture the upper cyclo-hexane layer was separated and the lower sulfuric layer was extracted with fresh cyclo-hexane in order to recover non-reacted cyclo-hexene: 8.9 gr. of non-reacted cyclo-hexene were determined by means of titration with bromine.

The sulfuric solution, containing both hydroxy-oxime and its sulfuric ester was treated at 0° C. with 400 ml. of water, then brought to a pH of about 7–8 with an 28% ammonia solution while maintaining the temperature at not higher than 5° C. The solution was then extracted with ether. The collected ethereal extracts were dried on anhydrous magnesium sulphate and treated with charcoal; after evaporation, 26.7 gr. of a slightly yellow colored solid product having a M.P.=94–97° C. was obtained by crystallizing from benzene which analyzed to be a pure alpha-hydroxy-cyclohexanonoxime having a melting point of 104–106° C. The melting point of the product mixed with alpha-hydroxy-cyclo-hexanon-oxime obtained by oximation of the alpha-hydroxy-cyclohexanone did not suffer any depression.

The I.R. spectrum of the obtained product coincided with that of the alpha-hydroxy-cyclo-hexanon-oxime obtained by oximation of the alpha-hydroxy-cyclohexanone.

The yield calculated on the converted cyclohexene was 80%.

Example 7

Into 250 cm.³ flask, provided with a stirrer, thermometer and metering device for solids, containing 30 gr. of cyclo-hexene and 80 gr. of glacial acetic acid, 37.5 gr. of nitrosyl sulfuric acid were slowly introduced while maintaining the temperature between 6 and 9° C. The stirring was continued for an hour after the addition, after which time the NO+ ion had disappeared (starch iodide paper test).

The homogeneous and slightly yellow colored reaction mixture was slowly poured into 200 ml. of water and the temperature maintained constant at 0° C.; the non-reacted cyclo-hexene was extracted with petroleum ether and determined to comprise 7.5 gr. non-reacted cyclohexene by means of titration with bromine.

The water solution was brought to a pH of about 7–8 with a 28% ammonia solution while it was being externally ice-cooled. The solution was then repeatedly extracted with ether. The collected ethereal extracts were dried on anhydrous magnesium sulphate, treated with charcoal and the ether removed by evaporation. After evaporation, 38 gr. of a solid and slightly yellow colored product having a M.P. 80–85° C. was obtained. By either crystallization from anhydrous ethyl alcohol or by distillation, pure alpha-acetoxy-cyclohexanon-oxime, having a M.P.=104–106° C. and a B.P.=111–114° C./2 mm. Hg was obtained; the melting point of the product mixed with alpha-acetoxy-cyclo-hexanon-oxime obtained by oximation of alpha-acetoxy-cyclohexanone did not suffer any depression.

The I.R. spectrum of the product obtained coincided with that of alpha-acetoxy-cyclohexanonoxime made by oximation of alpha-acetoxy-cyclohexanone.

The yield of alpha-acetoxy-cyclohexanonoxime, isolated by distillation referred to the converted cyclohexene, was 70.3%.

Example 8

The reaction was carried out according to the procedure described in Example 7, with the only variant that the nitrosyl sulfuric acid dissolved in 100% sulfuric acid in a molar ratio 1:1 was used as a starting solution. However, even in this case an alpha-acetoxy-cyclo-hexanon-oxime with the same yield and characteristics, as above was obtained.

Example 9

Into a 250 ml. flask, provided wiht a stirrer, thermomether and dropping funnel a solution of 20 gr. of cyclohexene in 10 gr. of propionic acid was introduced. During one hour a solution of 25 gr. of nitrosyl sulfuric acid in 20 gr. of 100% sulfuric acid was slowly introduced with stirring while maintaining the temperature at 8–10° C. About 2 hrs. after adding nitrosyl-sulphuric acid, the NO+ ion had completely disappeared (starch-iodide paper test). The excess propionic acid was extracted with petroleum ether and the oily layer neutralized with 28% ammonia with external ice-cooling. The neutralized fraction was repeatedly extracted with ethyl ether. After drying on anhydrous magnesium sulphate and evaporation, the collected ethereal extracts gave on oily residuum of 23 gr. having the following elementary analysis: O=58.9%; H=8.6%; N=8.4%.

After distillation under vacuum pure alpha-propionoxy-cyclohexanone-oxime having a B.P.=95° C./O. 1 mm. Hg was obtained. The elementary analysis have the following results: C=58.6%; H=8.5%; N=7.8%. Calculated for $C_9H_{15}NO_3$: C=58.3%; H=8.2%; N=7.6%.

The I.R. spectrum of the substance showed the following characteristic maxima (expressed in micron): 3.0; 5.75; 6.02; 8.45; 9.2; 10.1; 10.87; 11.42.

*Example 10*

Into a flask as used in Example 7, a solution of 20 gr. of cyclo-octene in 60 gr. of glacial acetic acid was introduced. 20 gr. of nitrosyl-sulfuric acid was then introduced slowly in small portions while maintaining the temperature at 10° C.

When the NO+ ion had completely disappeared, the reaction was complete. Pursuing the procedure of extraction described in Example 7, 26 gr. of an oil residuum was obtained, which slowly solidified into crystals, from which by re-crystallization from anhydrous ethyl alcohol alpha-acetoxy-cyclo-octanon-oxime having a M.P.=98–100° C., was obtained.

The elementary analysis has given the following results: C=59.3%; H=8.7%; N=7.1%. Calculated for $C_{10}H_{17}NO_3$: C=60.2%; H=8.6%; N=7.0%.

The I.R. spectrum of the substance showed the following characteristic maxima (expressed in micron): 3.03; 5.77; 7.97; 8.06; 9.74; 10.2; 10.38; 10.76; 11.04.

The measure has been carried out in KBr tablet.

We claim:

1. The process of preparing alpha-hydroxy-oximes which comprises reacting nitrosyl sulfuric acid, sulfuric acid and a compound selected from the group of olefinic compounds having the following structure:

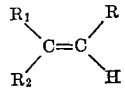

wherein $R_1$, $R_2$ and R represent a member selected from the class consisting of hydrogen, alkyl, monocyclic aryl, monocyclic aralkyl hydrocarbon groups and cycloaliphatic hydrocarbons having 4 to 12 carbon atoms selected from the group formed by $R_1$–$R_2$ and $R_1$–R joined through methylenic groups.

2. The process of preparing alpha hydroxy oximes which comprises reacting nitrosyl sulfuric acid, sulfuric acid having a concentration between 65% and 100% and a compound selected from the group of olefinic compounds having the general structure:

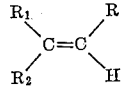

wherein $R_1$, $R_2$ and R represent a member selected from the group consisting of hydrogen, alkyl, monocyclic aryl, monocyclic aralkyl hydrocarbons groups and cycloaliphatic hydrocarbons having 4 to 12 carbon atoms selected from the group consisting of $R_1$–$R_2$ and $R_1$–R joined through methylenic groups, the molar ratio of olefinic compound to nitrosyl sulfuric acid and sulfuric acid respectively being between about 1 and 5 and 0.1 and 10, the reaction being carried out at temperatures within the range of about −50° C. and +50° C.

References Cited

UNITED STATES PATENTS

| | | | |
|---|---|---|---|
| 2,890,248 | 6/1959 | Craig | 260—566 |
| 3,078,306 | 2/1963 | Von Schickh et al. | 260—566 |

OTHER REFERENCES

Allisson et al.: Helv. Chim. Acta., vol. 34, pp. 453–455 (1951).

Beilstein: "Handbuck Der Organischen Chemie," vol. 1, p. 823 (1918).

Charlton et al.: J. Chem. Soc. (London), vol. of 1932, pp. 30–41.

Danilov et al.: C.A., vol. 48, pp. 1944–1946 (1954).

Hack et al.: C.A., vol. 52, pp. 5309–5311 (1958).

Locquin et al.: Compt. rend., vol. 176, pp. 516–518 (1923)

Richter: "The Chemistry of the Carbon Compounds," 3rd ed., vol. 2, p. 1 (1939).

Samne, Compt. rend., vol. 254, pp. 1643–1645 (1962).

Sasaki et al.: C.A., vol. 43, p. 5367[b], (1949).

FLOYD D. HIGEL, *Primary Examiner.*